United States Patent
Fischer

(10) Patent No.: US 8,347,395 B2
(45) Date of Patent: Jan. 1, 2013

(54) FILTERING DATA REQUIRING CONFIDENTIALITY IN MONITOR MIRRORING

(75) Inventor: Axel Fischer, Wermsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 897 days.

(21) Appl. No.: 11/364,412

(22) Filed: Feb. 27, 2006

(65) Prior Publication Data

US 2006/0200066 A1 Sep. 7, 2006

Related U.S. Application Data

(60) Provisional application No. 60/657,902, filed on Mar. 2, 2005.

(51) Int. Cl.
*G06F 21/00* (2006.01)

(52) U.S. Cl. .......................................... 726/26; 713/154

(58) Field of Classification Search .............. 705/2, 3; 707/9, 10, 100; 709/217, 219; 726/26, 27, 726/2, 21, 22, 23; 604/20; 345/2.1, 2.2, 345/698; 713/13, 154
See application file for complete search history.

(56) References Cited

U.S. PATENT DOCUMENTS

| | | | | |
|---|---|---|---|---|
| 6,587,082 | B1 * | 7/2003 | Moore | 345/1.3 |
| 7,280,087 | B2 * | 10/2007 | Williams et al. | 345/1.1 |
| 7,446,731 | B2 * | 11/2008 | Yoon | 345/2.2 |
| 2002/0099570 | A1 * | 7/2002 | Knight | 705/2 |
| 2004/0103147 | A1 * | 5/2004 | Flesher et al. | 709/204 |
| 2004/0107210 | A1 * | 6/2004 | Yang et al. | 707/104.1 |
| 2004/0172558 | A1 | 9/2004 | Callahan | |
| 2004/0193901 | A1 * | 9/2004 | Bharara | 713/193 |
| 2005/0091359 | A1 * | 4/2005 | Soin et al. | 709/223 |
| 2005/0165623 | A1 * | 7/2005 | Landi et al. | 705/2 |
| 2005/0195330 | A1 * | 9/2005 | Zacks et al. | 348/564 |
| 2005/0246204 | A1 * | 11/2005 | Simon | 705/3 |
| 2006/0031779 | A1 * | 2/2006 | Theurer et al. | 715/781 |
| 2006/0161853 | A1 * | 7/2006 | Chen et al. | 715/758 |
| 2006/0221067 | A1 * | 10/2006 | Kim et al. | 345/204 |

FOREIGN PATENT DOCUMENTS

| DE | 196 16 029 A1 | 11/1997 |
|---|---|---|
| WO | WO03090103 A1 * | 10/2003 |
| WO | WO 2004/046896 A2 | 6/2004 |

OTHER PUBLICATIONS

Sweeney, Latanya, "Replacing Personally Identifying Information in Medical Records, the Scrub System", In: Cimino, JJ, ed. Proceedings, Journal of the American Medical Informatics Assoc., Washington, DC: Hanley & Belfus 1996:333-337.*
German Office Action dated Oct. 25, 2005 with English Translation.

(Continued)

*Primary Examiner* — Eleni Shiferaw
*Assistant Examiner* — Hilary Branske
(74) *Attorney, Agent, or Firm* — Lempia Summerfield Katz LLC

(57) ABSTRACT

A method and an apparatus for monitor mirroring in the display of data requiring confidentiality is disclosed, including a computer system, an identification unit that identifies the data requiring confidentiality, and a filter unit that filters the identified data requiring confidentiality, so that only the filtered data and data not requiring confidentiality are shown on the monitor. The screen content of the monitor can thereupon be mirrored onto a further monitor.

16 Claims, 1 Drawing Sheet

OTHER PUBLICATIONS

Jan Kaiser, Content-Filter, Projekskizze zum BPS-Projekt, Version 1.5 (Aug. 2004), Ausbildungsbetrieb: fraLine IT-Schul-Service (FH FFM), Mar. 1, 2004-Jul. 31, 2004, pp. 1-25, eHB.

Euro Sereni et al., A Software Radio Architecture for Implementation Complexity Evaluation of Multi-Standard Transceivers, IST 2000 Mobile Summit Conference, Galway, Ireland, 6 pp., eHB.

C. Scheibe, "MaxiVista: Double Monitor", PC-Software, computer & Technik: computer, stern.de, Jan. 16, 2004, , http://www.stern.de/computer-technik/computer/shareware/index.htm?id=518959&nv=cp_L1_tt;eHB.

German Office Action dated Jan. 23, 2008 for DE 10 2005 009 528.3-53 with English translation.

Jan Kaiser, Content-Filter, Projektskizze zum BPS-Projekt, Version 1.5 (Aug. 2004), Ausbildungsbetrieb: fraLine IT-Schul-Service (FH FFM), Mar. 1, 2004-Jul. 31, 2004, p. 1-25, eHB.

Euro Sereni et al., A Software Radio Architecture for Implementation Complexity Evaluation of Multi-Standard Transceivers, IST 2000 Mobile Summit conference, Galway, Ireland, 6 Pgs., eHB.

German Office Action dated Jun. 4, 2008 for DE 10 2005 009 528.3-53 with English translation.

* cited by examiner

FILTERING DATA REQUIRING CONFIDENTIALITY IN MONITOR MIRRORING

RELATED APPLICATIONS

This application claims the benefit of priority to U.S. Provisional Application No. 60/657,902, filed, Mar. 2, 2005, which is incorporated herein by reference.

BACKGROUND

The application relates to processing data sets, which include data requiring confidentiality, and the display of such data on a display device.

In various applications, besides openly accessible data sets, data sets that are meant to be made available to only a restricted group of people must also be handled. Such applications may include medical applications, in which patient-specific data may be required to be protected against unauthorized access, as well as in financial or other privacy-related applications.

One aspect of working with a computer-supported data is that not only a single person, but a relatively large number of people, may work in front of a display device or monitor. To facilitate this, so-called monitor mirroring is provided. This is, a remote desktop connection is provided where one computer system can be connected to another. Particularly in remote desktop sharing, it is possible to mirror the screen content in a local system onto a second monitor, so that a larger number of people can track the same screen content. Particularly in a medical application, for instance in a hospital system, when a finding is made, it is appropriate for a team of physicians to be able to view the results of a CT scan or an X-ray or other diagnostic data. It is also desired for all these persons to have the same basis for assessment and thus identical screen content may be on all of the monitors. Commonly this is accomplished by a remote desktop connection between two devices.

However, this may result in a problem where the data requires confidentiality. In previous systems, all the data displayed locally on the monitor were also shown on the remote workstation or remote monitor. In many jurisdictions, this may be prohibited by law or regulation for certain types of data.

BRIEF SUMMARY

A method and apparatus are disclosed where an expanded monitor capacity can be made available by means of further monitors, while permitting conformance with regulations and rules regarding data requiring confidentiality.

A method is described for monitor mirroring in the display of data sets that include data requiring confidentiality, in which at least two monitors that are associated with one or more computer systems are provided. The method may include the steps of:

identifying data requiring confidentiality from the data sets that are to be displayed;

filtering the data requiring confidentiality before the data is displayed; displaying the filtered data on at least one monitor; and performing the monitor mirroring with the filtered data.

Since the protection of data requiring confidentiality may be considered a priority in the display of data, the identification and filtering operation may be performed before every display of data. In an aspect, the identification and filtering may be performed upstream of the graphical interface, regardless of which display device will display the data. That is, identification and filtering of data is performed even if the data are to be displayed on a local monitor.

In another embodiment, the data on the local system or on the local monitor are not filtered (so that thus even the data requiring confidentiality need not be identified), and the filtering (and the prior identification) are done only on or for one or more remote monitors. This embodiment may be used when a user must first become authorized to use the applicable local system by way of a password, and with the further condition that the authorized user is also authorized to read data requiring confidentiality. The authorization may be accomplished by a login procedure or an authorization for the particular application program, to establish that a particular user is also authorized to view data requiring confidentiality. In this circumstance, a filtering process may not need to be performed at the local monitor.

However, if a further monitor is to be connected to the local monitor for monitor mirroring, then the system administrator may specify whether the filtering operation is to be done for all monitors in every case, or only for the remote monitors. In an embodiment where all of the monitor displays are filtered, all of the users have an identical basis for assessment, and the same screen content is shown on all of the monitors. This makes communication easier between users about the particular screen content, especially when the monitors are not collocated.

In an embodiment, a hardware—and/or software-based product is located upstream of the various monitors, interacting with the data transmission and copying and repeating—display screen content. The operations of identifying and filtering may be performed independently of the computer system (including any associated databases and operating systems).

The operation of filtering can be performed in a variety of ways. The user or the system administrator may specify certain filtering criteria. As an example, but not by way of limitation, only the patient name and/or other information identifying individual patients may be removed from the display. In another aspect, the quantity of data requiring confidentiality may be greater, so that all personal and/or demographic data are included, and for example the name of the patient, date of birth, address, banking information, insurance number, and so forth, are excluded. Where the method, system or apparatus is used for a financial application, for example, the confidentiality requirements may be different possibly involving additional data requiring confidentiality (such as a PIN, social security number and the like).

There are various possible methods of altering the screen content with regard to the data requiring confidentiality so that the data requiring confidentiality are excluded from display. In an aspect, the data requiring confidentiality may be deleted. Such data may not be intrinsically deleted in the computer system or in a database that is referenced, but only from the representation of the data that is intended for display on the monitor. In another aspect, the data requiring confidentiality may be made anonymous and/or pseudonymous. When making the data anonymous, the existing applicable data structure may be maintained intact, and only the field content (for instance, for the field "patient's name") may be deleted or replaced by some consistent indication (such as "XXX"). In the case of pseudonymizing, each datum requiring confidentiality is assigned a pseudonymous datum with a unique assignment prefix. In the field "patient's name", all that is shown may be, for instance, "sample name".

It is also possible to modify the data structure for filtered data and to show only the data not requiring confidentiality. In that situation, the fields for the data requiring confidentiality (for instance for the patient's name, birth date, and so forth) would no longer appear on the display. This method has the advantage that the user is not presented with information which may not be relevant and can concentrate the data being displayed.

Monitor mirroring may be performed by connecting an additional monitor, which may be a remote monitor, to a local monitor. The circle of observers may be widened still further by mirroring the local monitor, or its contents, onto a plurality of monitors. The monitor or monitors on which the monitor mirroring is to be executed may belong to the same computer system or different computer systems. Moreover, they may be connected to the local system by way of any data communications method (cord connection, wireless connection, local area network, wide area network, virtual private network, other interfaces, online or offline connections, and so forth). The identification and/or the filtering of data requiring confidentiality may be performed automatically. Thus, when the task of displaying certain data sets is assigned, the identification and/or filtering operation is initiated automatically. Both operations may be executed automatically, so that misuse can be reliably avoided.

It may be appropriate, in some circumstances, for the filtering operation to be deactivated. This may occur whenever it can be assured, by a specific authorizing process, that user of a display is authorized to read data requiring confidentiality. The filtering process may then be switched off, so that the user may view the data requiring confidentiality.

The filtering property may also be deactivated whenever the remote desktop connection is disconnected, so that only one local monitor is present. In that case, the screen content may be generated anew, so that the data requiring confidentiality now becomes visible.

In hospital use, then the filtering operation may be performed by a search process in predefined standardized data structures. For example, data are typically represented in DICOM (Digital Imaging and Communications in Medicine) format, and the patient information that requires confidentiality may be contained in the DICOM header.

When a filtering operation is performed so that data not requiring confidentiality and filtered data are displayed, the filtered data may be stored in memory. This makes error correction provisions easier and allows for analysis of the viewed material subsequent to the display thereof.

The method and system may automatically recognize the connection of a remote service. When another monitor service is connected, the filtering operation may be triggered automatically.

The above-described embodiments of the method may also be embodied as a computer program product wherein the program code instructions for performing the functions of the method described herein are embodied in a computer readable medium, and the program code is executed by a processor. The computer readable medium may be any device capable of storing computer readable program code and being accessed directly or indirectly by a processor.

The hardware and software may be embodied in a single device or in multiple devices to be used either while co-located or in a distributed configuration. In another aspect, a shared system of devices including performing some of the operations of the method at one device and the remaining operations of the method at one or more second device, so that, in combination, all of the steps are performed. A product, such as a computer system or monitor, may include some or all of the code for performing the filtering and/or mirroring. By connecting the product for mirroring, the filtering automatically occurs. The product is used as the primary or local monitor or as the secondary or auxiliary monitor.

BRIEF DESCRIPTION OF THE DRAWINGS

In the following detailed description of the drawings, exemplary embodiments, which are not intended to be limiting, are discussed along with their characteristics and further advantages. In the drawings.

DETAILED DESCRIPTION OF THE DRAWINGS AND THE PRESENTLY PREFERRED EMBODIMENTS

Exemplary embodiments may be better understood with reference to the drawings, but these embodiments are not intended to be of a limiting nature. Like numbered elements in the same or different drawings perform equivalent functions.

Figure 2:
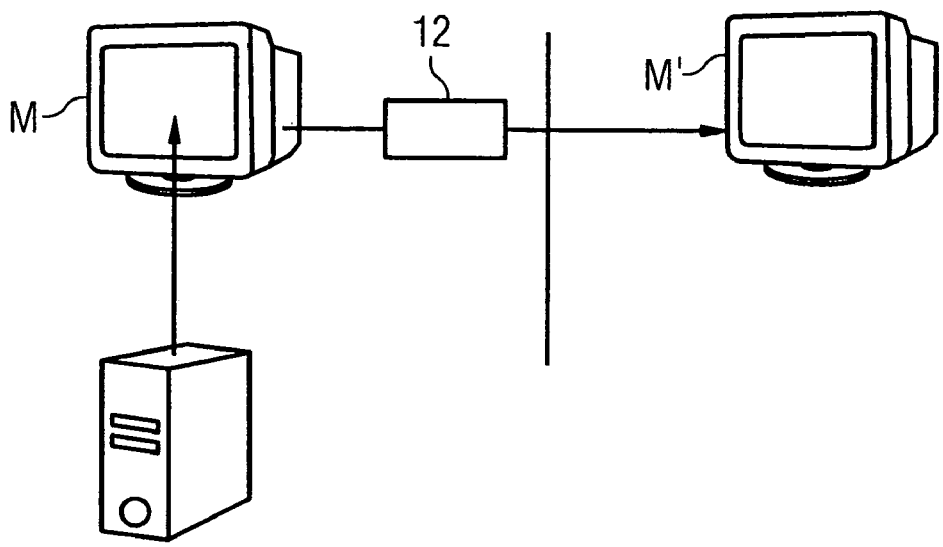
FIG. 2 is an overview of a known monitor mirroring from the prior art.

A computer system RS includes a display device or monitor M. If the screen content of the monitor M is to be made available on a further display device M', then until now it has been known to make a connection, which may optionally have data filters 12, between the two display devices M, M'. This is shown in FIG. 2 for the method known from the prior art.

It is disadvantageous that data requiring confidentiality are filtered only on the mirrored monitor M', while they are still shown on the local monitor M. This may create a data security risk and has the further disadvantage that the user of the monitor M and the user of the mirrored monitor M' do not have an identical view available.

Figure 1:
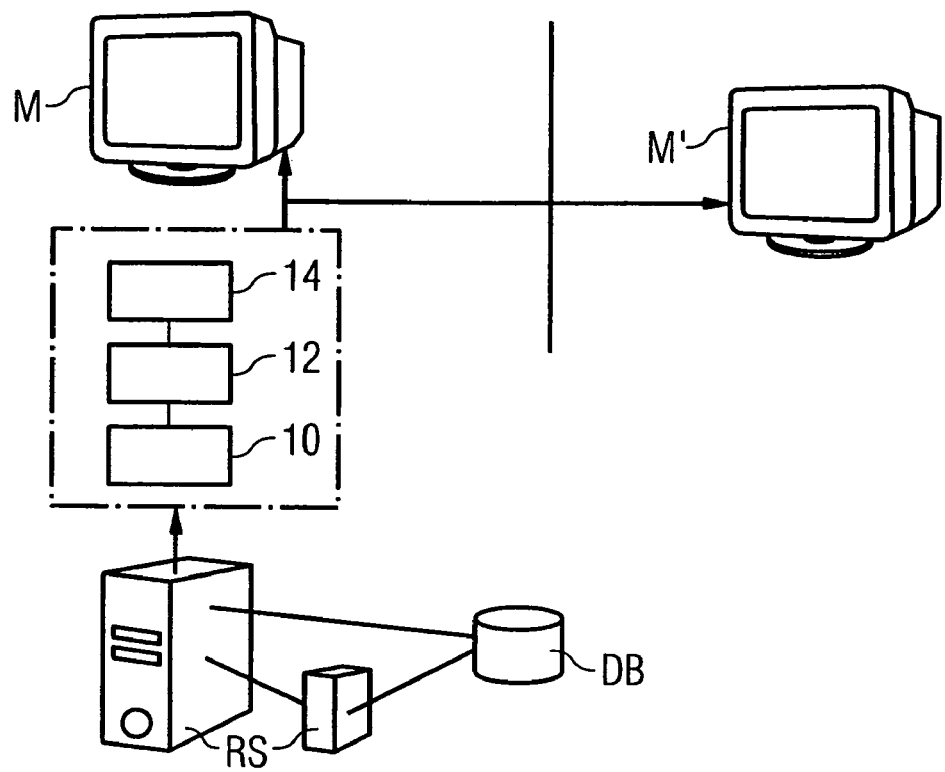
FIG. 1 is an overview of a monitor mirroring system with filtering of confidential data in one embodiment.

FIG. 1 shows an example of another system and apparatus. The computer system RS may include only one local workstation, or it may be a complex network system, comprising a plurality of workstations, which may, optionally, access a database DB. Monitor M is assigned to the local system.

When the monitor M is to be mirrored onto at least one further monitor M', then an identification unit 10, a filter unit 12, and a mirroring module 14 are provided.

The identification unit 10, the filter unit 12 and the mirroring module 14 may be embodied as a heterogeneous product and located in part, or entirely, in the form of hardware and/or software. In an aspect, the components may be embodied separately as independent units or combined into a more-comprehensive product. In an example, the identification unit 10, the filter unit 12, and the mirroring module 14 are embodied as a unitary product. This is represented in FIG. 1 by the dashed line around those components.

The identification unit 10, the filter unit 12 and the mirroring module 14 are located downstream of the computer system RS and upstream of the monitors M and M'. Thus, data requiring confidentiality are filtered before being shown on a monitor M, M'. Even on the local monitor M, only filtered data are displayed.

In another example, the filter unit 12 is located upstream of the graphical interface. Access to the filter unit 12 occurs after database access. These accesses can be executed internally or externally.

A monitor mirroring itself can be performed during an ongoing display operation. That is, if a request for data sets to be displayed on the monitor M is executed, then the data sets are shown on the monitor M. Whenever necessary, they can be filtered by the filter unit 12. When the screen content of the monitor M is mirrored onto a further monitor M', this operation can also be done during the ongoing display of the screen content on the monitor M. When the other screen M' or the remote service is connected or actuated, the system automatically recognizes that fact. In that event, both the screen content of the monitor M and the screen content of the monitor M' are re-constructed (or constructed for the first time in the case of the monitor M'). This reconfiguration is based on the filtering operation. As a result, only publicly accessible data, and not data requiring protection, are displayed.

If the screen view of the original local monitor M also included data requiring confidentiality, then after the remote service has been activated, this screen content of the monitor M may be shown altered, so that after the filtering operation, it includes no data requiring protection and now includes only publicly accessible data. The identical screen content can then be mirrored onto the second monitor M'.

If a change is then to be made from one screen content format to another, such a change is accomplished on the condition that the data to be displayed pass through the filtering operation of. Therefore, the same screen content is made available on the monitors M and M'.

In an aspect, if the remote service connection (or the monitor mirroring) is terminated, then a reconfiguration is performed on the local monitor M. Depending on the specific design requirements, this newly constructed data screen display may also include data requiring confidentiality, if the user is authorized to view such data.

The filtering operation is performed in every case automatically, so that regardless of the choice of monitor M, M', a filtering of data requiring confidentiality takes place. This contributes to the security of the entire system.

In another example, either before or after the connection of the remote service, a deactivation of the filter mechanism causes a data display area to be incorporated into the screen display requesting information to establish the authorization of the user, for example by the entry of a password.

All or some of the data that are intended for display on a display device M, M' pass through the filter unit 12, regardless of the origin of the data. The data may originate in an internal source of the computer system RS or external sources, such as a network, an external database, or the like.

The data is displayed on a monitor M, M'. However, it is also possible for this to be accomplished with other display means having the same or similar functions, such as laptop computers, handheld devices, wireless devices, video projectors or the like. This may be useful particularly when the embodiment is not employed in medical systems in the general field of hospitals, but in general is used for technical devices that are meant to be subjected to maintenance by maintenance technicians. In this respect, the maintenance technician may track the process remotely. The display devices of the maintenance technician in this case may connect to the particular local monitor M by way of communications connections such as infrared, BLUETOOTH, communications cable local area network, the Internet, or the like.

The system and method may be used with computer systems and displays of varying manufacture when the interfaces that the system employs are compatible with the used hardware interfaces, communications protocols and data formats.

In the medical field, the data may be present in DICOM format. In this circumstance, the identification of data requiring confidentiality may be simplified, as only one search operation has to be performed, in a known data format. Overall, this leads to faster processing and a faster display of the data.

Incorporation of the present system, apparatus or method into existing systems is practical as the input and output protocols and data format may be adapted to the requirements of the existing system components. Thus, the capabilities and functions described herein may be furnished as part of a complete system or be added later.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims. In the claims, means-plus-function clauses are intended to cover the structures described herein as performing the recited function, their structural equivalents and equivalent structures.

The invention claimed is:

1. A method for monitor mirroring of a computer system in the display of data sets that include data requiring confidentiality, the method comprising:
    identifying data requiring confidentiality from data sets that are to be displayed at a first monitor and a second monitor;
    filtering out the data requiring confidentiality from a representation of the data sets when the second monitor is connected to the first monitor, wherein filtering out the data includes deleting the data requiring confidentiality from the representation of the data sets, such that the filtered data sets are non-confidential information;
    displaying the filtered data sets on the first monitor, wherein the data requiring confidentiality is not displayed;
    performing the monitor mirroring with the filtered data sets onto the second monitor when the second monitor is connected to the first monitor, such that screen content for the filtered data sets of the first monitor is the same as screen content for the filtered data sets of the second monitor when the first monitor is mirrored on the second monitor; and
    reconfiguring the filtered data sets displayed on the first monitor when the connection is terminated, such that the data requiring confidentiality is displayed on the first monitor when a user of the first monitor is authorized to view the data requiring confidentiality,
    wherein the data requiring confidentiality from the data sets is identified before the monitor mirroring is performed.

2. The method as in claim 1, wherein the filtering includes anonymizing, pseudonymizing the data requiring confidentiality, or combinations thereof.

3. The method as in claim 1, wherein the monitor mirroring includes the mirroring of the first monitor onto a plurality of second monitors, the plurality of second monitors comprising the second monitor.

4. The method as in claim 1, wherein at least one of the filtering and the identifying is done automatically.

5. The method as in claim 1, wherein filtering is operable to be deactivated.

6. The method as in claim 1, wherein the data requiring confidentiality involve medical data.

7. The method as in claim 6, wherein the data requiring confidentiality is in Digital Imaging and Communications in Medicine (DICOM) format.

8. The method as in claim 1, wherein the displayed filtered data sets are stored in memory.

9. The method as in claim 1, wherein the identifying is controlled via a data structure of the data sets.

10. The method as in claim 2, wherein at least one of the filtering and the identifying is done automatically.

11. The method as in claim 10, wherein filtering is operable to be deactivated.

12. The method as in claim 11, wherein the data requiring confidentiality involve medical data.

13. The method as in claim 10, wherein the identifying is controlled via a data structure of the data sets.

14. The method as in claim 1, further comprising automatically recognizing a connection of the second monitor, such that filtering is triggered automatically.

15. An apparatus for monitor mirroring in a display of data sets that include data requiring confidentiality, the apparatus comprising:
- an identification unit operable to identify the data requiring confidentiality from a quantity of data sets that are to be displayed;
- a filter unit operable to filter out the data sets, such that the data requiring confidentiality is deleted from the data sets;
- a first monitor associated with a computer system and configured to display the filtered data sets;
- a second monitor, the filter unit being operable to delete the data requiring confidentiality when the second monitor is connected to the first monitor; and
- a mirroring module operable to execute the monitor mirroring when the second monitor is connected to the first monitor, such that the filtered data displayed on the first monitor is mirrored onto the second monitor, such that screen content for the filtered data sets of the first monitor is the same as screen content for the filtered data sets of the second monitor when the first monitor is mirrored on the second monitor, wherein the filter unit is located downstream of the computer system and upstream of the first monitor and the second monitor, wherein the filter unit is configured to reconfigure the filtered data sets displayed on the first monitor when the connection is terminated, such that the data requiring confidentiality is displayed on the first monitor when a user of the first monitor is authorized to view the data requiring confidentiality, and wherein the identification unit is operable to identify the data requiring confidentiality from the quantity of data sets that are to be displayed before the monitor mirroring is executed.

16. The apparatus as in claim 15, wherein the filter unit is located upstream of a graphical interface of the computer system.

* * * * *